United States Patent
Allahyari et al.

(10) Patent No.: US 12,124,515 B1
(45) Date of Patent: Oct. 22, 2024

(54) RESPONSES TO REQUESTS FOR INFORMATION

(71) Applicant: Wells Fargo Bank, N.A., San Francisco, CA (US)

(72) Inventors: Mehdi Allahyari, Alpharetta, GA (US); Thejas M. Bhat, Bangalore (IN); Brandon P. Castaing, Bellevue, WA (US); Sandeep Pradhan, Bangalore (IN); Vinothkumar Venkataraman, Bangalore (IN); Yang Yang, Mountain View, CA (US); Anusha Yenduri, Rajahmundry (IN); Naveen Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 423 days.

(21) Appl. No.: 17/456,979

(22) Filed: Nov. 30, 2021

(51) Int. Cl.
    *G06F 16/9032* (2019.01)
    *G06F 16/9035* (2019.01)
    *G06F 16/93* (2019.01)
    *G06F 40/205* (2020.01)
    *G10L 25/30* (2013.01)

(52) U.S. Cl.
    CPC .... *G06F 16/90332* (2019.01); *G06F 16/9035* (2019.01); *G06F 16/93* (2019.01); *G06F 40/205* (2020.01); *G10L 25/30* (2013.01)

(58) Field of Classification Search
    None
    See application file for complete search history.

(56) References Cited

U.S. PATENT DOCUMENTS

| | | |
|---|---|---|
| 7,117,172 B1 | 10/2006 | Black |
| 7,971,141 B1 | 6/2011 | Quinn et al. |
| 8,606,678 B2 | 12/2013 | Jackowitz et al. |
| 8,706,569 B2 | 4/2014 | Al-Abdulqader et al. |
| 9,082,282 B1 * | 7/2015 | Landefeld ............ G06F 3/04842 |
| 9,129,279 B1 | 9/2015 | Zeanah et al. |
| 9,235,978 B1 * | 1/2016 | Charlton ................. G06F 9/542 |
| 10,572,547 B2 | 2/2020 | Andrejko et al. |
| 10,621,286 B2 | 4/2020 | Abou Mahmoud et al. |

(Continued)

FOREIGN PATENT DOCUMENTS

| | | |
|---|---|---|
| CN | 108985935 A | 12/2018 |
| CN | 109472646 A | 3/2019 |

(Continued)

OTHER PUBLICATIONS

Usbeck, Ricardo, et al. "Benchmarking question answering systems." Semantic Web, vol. 10, No. 2, pp. 293-304, 21 (Jan. 2019).

(Continued)

*Primary Examiner* — Nicole A K Schmieder
(74) *Attorney, Agent, or Firm* — Merchant & Gould P.C.

(57) ABSTRACT

Computer-automated systems and methods that retain requests for information until documents containing the information are released at a later date. Release of the documents can trigger natural language understanding of the documents to be automatically performed and responses to the requests to be generated. In some examples, the responses include recommendations for taking or not taking financial actions relating to the request and the information.

20 Claims, 6 Drawing Sheets

(56) References Cited

U.S. PATENT DOCUMENTS

| | | | |
|---|---|---|---|
| 10,902,511 | B2 | 1/2021 | Sion et al. |
| 10,937,036 | B2 | 3/2021 | Wasser |
| 10,956,006 | B2 | 3/2021 | Napolitano et al. |
| 2009/0271287 | A1 | 10/2009 | Halpern |
| 2009/0276368 | A1 | 11/2009 | Martin et al. |
| 2010/0094740 | A1 | 4/2010 | Richter |
| 2010/0281426 | A1* | 11/2010 | Schmidt .............. G06F 16/2477 715/764 |
| 2014/0101139 | A1 | 4/2014 | Gemert et al. |
| 2014/0207811 | A1 | 7/2014 | Kim et al. |
| 2014/0350349 | A1 | 11/2014 | Geurts et al. |
| 2015/0363862 | A1 | 12/2015 | Ranft et al. |
| 2020/0053053 | A1 | 2/2020 | Mossoba et al. |
| 2020/0258013 | A1 | 8/2020 | Monnett et al. |
| 2020/0279553 | A1 | 9/2020 | McDuff et al. |
| 2020/0380419 | A1 | 12/2020 | Khazane et al. |

FOREIGN PATENT DOCUMENTS

| | | |
|---|---|---|
| CN | 109934721 A | 6/2019 |
| CN | 111222979 A | 6/2020 |
| CN | 112100344 A | 12/2020 |
| CN | 112287242 A | 1/2021 |
| IN | 111539801 A | 8/2020 |
| KR | 100787396 B1 | 8/2007 |
| KR | 101883818 B1 | 11/2017 |
| WO | 2019071906 A1 | 4/2019 |

OTHER PUBLICATIONS

Shaikh, Shakila. "IRuSL: Image Recommendation Using Semantic Link." 2016 8th International Conference on Computational Intelligence and Communication Networks (CICN), 24-25, (Dec. 2016). Abstract only.

Zheng, Xiao-lin, et al. "FinBrain: when finance meets AI 2.0." Frontiers Inf Technol Electronic Eng 20, 914-924 (2019). https://doi.org/10.1631/FITEE.1700822.

Thelwall, Mike, et al. "Damping Sentiment Analysis in Online Communication: Discussions, Monologs and Dialogs." In: Gelbukh A. (eds) Computational Linguistics and Intelligent Text Processing ( CICLing 2013). Lecture Notes in Computer Science, vol. 7817. Springer, Berlin, Heidelberg. https://doi.org/10.1007/978-3-642-37256-8_1.

Zhang, Wei, et al. "An intelligent textual corpus big data computing approach for lexicons construction and sentiment classification of public emergency events." Multimed Tools Appl 78, 30159-30174 (2019). https://doi.org/10.1007/s11042-018-7018-x. Abstract only.

Beck, Melanie and Micallef, Ryan. "Developing NLP for Automated Question Answering." Cloudera, Inc. (Apr. 2020), https://blog.cloudera.com/developing-nlp-for-automated-question-answering/.

Boyer, John M. "Natural language question answering in the financial domain." CASCON '18: Proceedings of the 28th Annual International Conference on Computer Science and Software Engineering, pp. 189-200 (Oct. 2018). Abstract only.

* cited by examiner

RESPONSES TO REQUESTS FOR INFORMATION

BACKGROUND

Customers and prospective customers of business enterprises often seek advice or other information relating to actions they may be considering taking. Oftentimes, the information that is sought may not be available or is not tailored to the customers' needs. Such actions can include, for example, purchases, sales, trades, investments, and other decisions.

SUMMARY

Embodiments of the present disclosure are directed to improvements in customer experiences with computer-automated interaction interfaces.

Embodiments of the present disclosure are directed to reducing the time it takes for a customer or prospective customer of an enterprise to receive desired information, or a recommendation based on information, which information is not yet available. A request for the information or advice can be made prior to the information's release and retained pending the release. Upon release of the information, the information or advice is automatically generated based on a machine understanding of the released information. Thus, the information or advice is delivered to the customer or the prospective customer sooner.

An aspect of the present disclosure relates to: a computer-implemented method, including: receiving a request for information; determining that a document including the information has not been released; based thereon, retaining the request until the information is released; parsing the document, when released, to obtain the information from the document; and based on the parsing, generating a response to the request, the response including the information.

According to another aspect, the response includes a computer-generated text message or a computer-generated audio message.

According to another aspect, the determining includes determining when the document is scheduled to be released; and the retaining includes selecting a storage location in a computer memory for storing the request based on a length of time until the document is released.

According to another aspect, the method further includes generating a message indicating when the response will be provided.

According to another aspect, the method further includes determining when the response will be provided based on a scheduled release of the document.

According to another aspect, the method further includes generating a possible request, the possible request corresponding to the request; and providing the possible request for display at a graphical interface, wherein the receiving the request includes receiving a selection, via the graphical interface, of the possible request.

According to another aspect, the generating a possible request includes: processing, with a machine learning model, data relating to the user; and based on the processing, using the machine learning model to output the possible request.

According to another aspect, the data includes a prior request for information associated with the user.

According to another aspect, the data includes a purchase history associated with the user.

According to another aspect, the method further includes determining, with the machine learning model and based on the possible request, that the document will include the information.

According to another aspect, the generating a possible request includes receiving, via another graphical interface, a selection of an unreleased document, the selection corresponding to the document.

According to another aspect, the response includes an indication that the document has been released.

According to another aspect, the parsing includes applying natural language understanding to text of the document.

According to another aspect, the response includes a recommendation, based on the request and the information, to perform or not to perform a financial action.

According to another aspect, a system, includes: one or more processors; and non-transitory computer-readable instructions that, when executed by the one or more processors, cause the system to: receive, at a first time, a request for information; determine, using a web crawler, that a document containing the information has not been released at the first time and, based thereon, retain the request until a second time that is after the first time; determine, using the web crawler at a third time that is after the first time, that the document has been released; parse text of the released document using natural language understanding to obtain the information from the document; and generate, at or before the second time, a response to the request, the response including the information, the generate a response being triggered by the information being obtained from the document.

According to another aspect, the response includes a computer-generated text message or a computer-generated audio message.

According to another aspect, the instructions, when executed by the one or more processors, cause the system to: generate a message indicating when the response will be provided based on a scheduled release of the document.

According to another aspect, the response includes an indication that the document has been released.

According to another aspect, the response includes a recommendation, based on the request and the information, to perform or not to perform a financial action.

According to another aspect, a computer-implemented method, includes: receiving, at a first time, a request for information associated with a financial action; determining, using a web crawler, that a document including the information has not been released at the first time; determining that the document is scheduled to be released at a second time that is after the first time; retaining the request until a third time that is after the first time and at or after the second time, including: selecting a storage location in a computer memory for storing the request based on a length of time between the first time and the second time; and storing the request in the storage location; determining, at or after the second time and using the web crawler, that the document has been released; parsing, using natural language understanding, text of the released document to obtain the information from the document; and based on the parsing, generating, at or after the second time, a response to the request, the response including a text message or an audio message including: the information; and a recommendation to perform or not to perform the financial action.

The details of one or more techniques are set forth in the accompanying drawings and the description below. Other features, objects, and advantages of these techniques will be apparent from the description, drawings, and claims.

DETAILED DESCRIPTION

The present disclosure is directed to automated generation of responses to user requests. The requests are made at a time when the information needed to provide the response has not yet been released. Upon release of the information, the response is automatically generated and provided to the user. The response can be presented to the user in various forms, such as through a communication (e.g., electronic mail, text or audio message, alert or notification, etc.) and/or by a virtual agent of the business enterprise (e.g., a financial institution).

For example (this example may be referred to herein by the shorthand, "kitchen renovation example"), a customer of a financial institution is considering whether to renovate the kitchen in their home. It is important to the customer that the financial institution provide a recommendation to renovate, not to renovate, or delay renovation based on sound, comprehensive financial data and reasoning specific to the customer (e.g., personal financial data). At the same time, it is important to the customer that the financial institution provide such an adequately supported recommendation as soon as practicable.

Timing of financial decisions can be critical in many contexts, such as when to buy an asset or sell an asset, as asset value can be extremely time sensitive.

In the kitchen renovation example, several factors can make the decision whether to renovate a time sensitive one. For instance, the renovation may have to be completed, depending on geographic location, before winter, or before the rainy season. Contractors and subcontractors may have to be booked with advance notice. Unexpected supply chain bottlenecks or disruptions can mean that materials for the renovation may not be available if an order is placed too late. Other factors can also contribute to the time sensitivity of the decision.

Continuing with the kitchen renovation example, at the time the customer requests advice from the financial institution (e.g., from a virtual agent of the financial institution) on whether to renovate the kitchen, there may be insufficient information released and available to the financial institution to provide an adequately supported recommendation. For example, it may not be known if a bill before the United States Congress at the time of the request and that would allow the kitchen renovation to be tax deductible will pass, and pass in time for the customer to benefit from the tax deduction in the current tax year. As another example, the customer may have recently sent a child to university for the first time, and there is insufficient financial data at the time of the customer's request to indicate to what extent the customer's average monthly spending has changed due to this lifecycle event.

Continuing with the kitchen renovation example, there may be two documents (passed or denied legislation for the bill; and the customer's checking account statement for the current statement period) that have not yet been released that are important to providing an adequately supported recommendation to the customer regarding the kitchen renovation request.

The present disclosure is directed to systems and methods that are computer-automated, that retain the customer's request until the relevant information (in this case, the two documents) are released, the release of the documents automatically triggering a parsing (e.g., with natural language understanding) of the documents and, based on the parsing, generating a recommendation in response to the user's request, which recommendation is automatically provided to the customer, e.g., in the form of an email or other text or audio message, alert or notification, or otherwise presented by a virtual agent.

By retaining user requests (e.g., requests of a customer or a prospective customer) until information is released and then responding to the request upon release of the information, several advantages and practical applications are realized.

For example, embodiments of the present disclosure can enhance interactions between an institution or business enterprise and a user, optimizing how long it takes for the user to receive a response and the amount of data supporting the response. For instance, the amount of time it takes for the user to receive a response is shortened by more than it would have been otherwise, while the amount of data support for the response is maximized. As a result, users can be provided better and/or more timely advice on what actions to take or not take.

Further practical applications of embodiments of the present disclosure include determining the optimal location to store the user's request pending release of the information. For example, different types of digital memory can be selected from based on the anticipated length of time between when the request is made and when the information will be released. The type of memory can be selected to optimize memory and processing resources of the institution or business enterprise.

Further practical applications of embodiments of the present disclosure include using specialized computer tools, such as a web crawler, to harvest pieces of information for the institution or business enterprise from external or internal websites. In the kitchen renovation example, a web crawler can be used to determine when the legislation document is released, for instance, by crawling the relevant government website continuously, or periodically.

It can be appreciated that principles of the present disclosure can be readily applied to financial institutions who provide financial services and guidance to their customers, as well as institutions and business enterprises in industries other than the financial industry.

According to another example use case employing principles of the present disclosure, a product list for a business is determined and a user associated with the business is advised accordingly. The product list is determined based on a later released document that shows the current and past performance of the business.

It should be appreciated that principles of the present disclosure can be applied outside of business or financial contexts. For instance, according to another example use case employing principles of the present disclosure, a user is alerted to a significant scientific discovery. For example, a request to be so alerted is submitted by the user. A journal article is later released and automatically parsed, from which it is automatically determined that criteria have been met for a significant scientific discovery, at which point the user's pending request can be automatically responded to by a virtual agent that the user has subscribed for.

Figure 1:
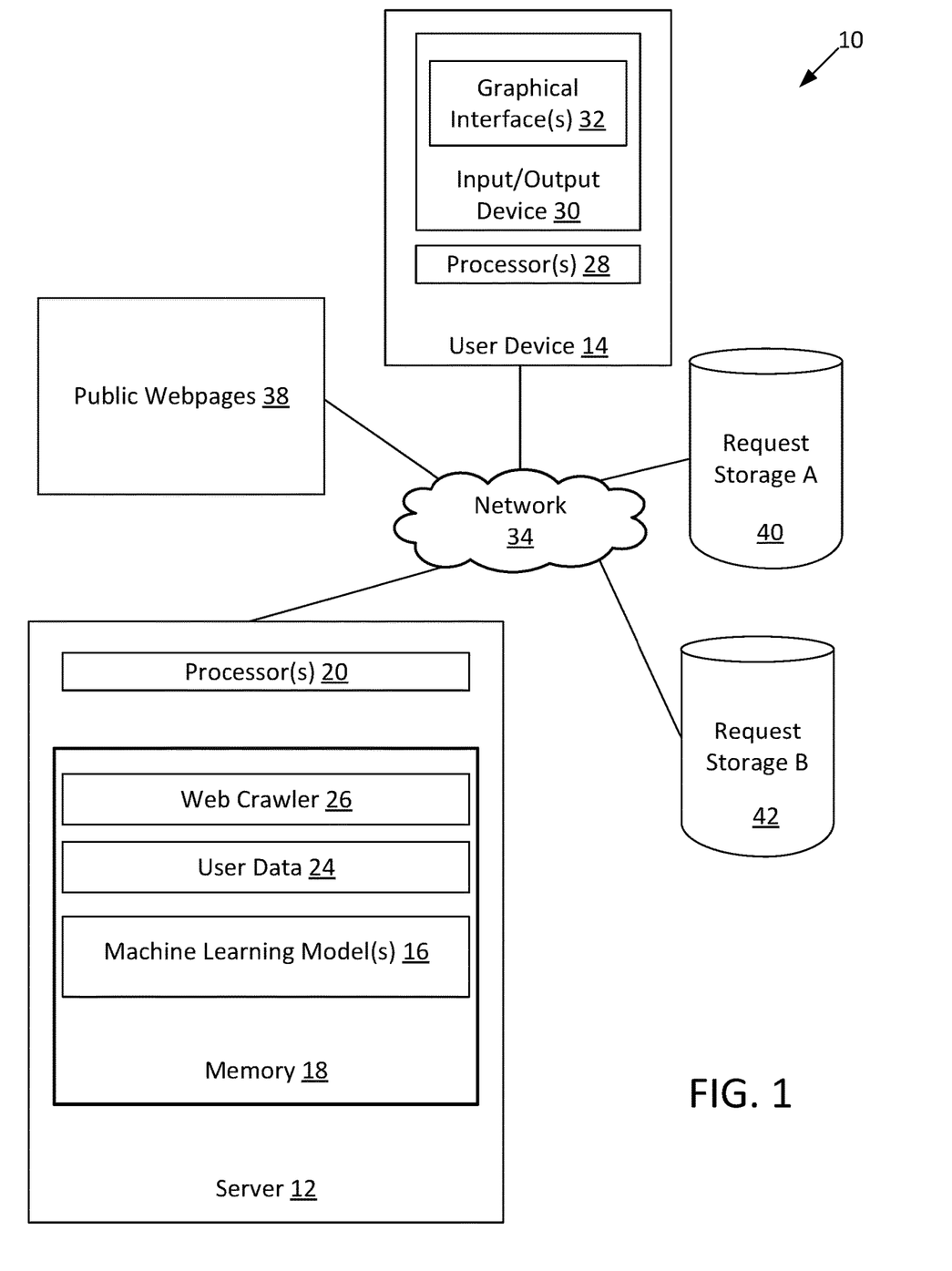
FIG. 1 schematically shows components of an example system according to the present disclosure.

FIG. 1 schematically shows components of an example system 10 according to the present disclosure. The system 10 includes a server 12 and a user device 14.

The user device 14 is a computing device, such as a laptop computer, a desktop computer, a tablet computer, a smartphone, etc.

The server 12 is a computing device configured to perform request and response processing in accordance with the present disclosure using a web crawler 26, user data 24, and machine learning model(s) 16, all stored on a memory 18. The server 12 can be associated with a given financial services institution or other business enterprise. The server 12 can be configured to be accessed only by the institution to which it is associated. Alternatively, the server 12 can correspond to shared computing resources, such as a computing cloud, to which a given institution can gain access for their private computing needs.

The server 12 includes one or more processor(s) 20 configured to process data and execute computer readable instructions stored on the memory 18, for performing functions of the server 12 described herein.

The user device 14 includes one or more processor(s) 28 and an input/output (I/O) device 30. The I/O device 30 is configured to generate graphical interface(s) 32, and/or audio interfaces. For example, the I/O device 30 can include a touch screen, a microphone and/or a speaker. The processor(s) 28 can execute computer readable instructions for performing functions of the user device 14, such as displaying graphical interfaces (such as those shown in FIG. 4 or 5) and otherwise providing output for a user to see or hear, and receive input from the user.

The server 12 and the user device 14 are interconnected via a network 34. The network 34 can be any suitable data network, such as the internet, a wide area network, a local area network, a wired network, a wireless network, a cellular network, a satellite network, a near field communication network, or any operatively connected combination of these. Inputs to the user device 14 can be received by the server 12 via the network 34 and vice versa.

User data 24 can include any data that may be relevant to responding to a user's request. Some user data 24 (such as name, birth date, income, family size, job title, family status, etc.) can be specific to each user. Other user data 24 can be non-user specific, such as current mortgage interest rates, price indices, tax codes, exchange rates, and so forth.

User data 24 can be obtained from a variety of different sources, including public sources and private sources. Some examples of sources from which user data 24 can be obtained include user account profiles that the users set up with the institution or business enterprise, government websites, property valuation websites (e.g., websites that provide estimates of home values), social media posts, checking account statements, savings account statements, credit card statements and other documents showing purchase history, investment account statements, lease documents, mortgage or other loan documents, scientific journals, magazines, newspapers, and so forth.

Thus, for example, user data 24 can be obtained from various databases external to the institution that store publicly accessible information about customers and/or prospective customers, and/or for which access has been permitted to the financial institution by the customer or prospective customer. Such databases can include for, example, databases of other financial institutions, databases of medical, travel, social media, and other service providers, government databases that store, for example, tax documents, lien documents, judgments or other judicial proceeding documents, real estate documents, databases that store news stories and scientific articles, and so forth.

User data 24 can also include data obtained by direct interactive engagement between the institution (e.g., a virtual agent of the institution) and the user, e.g., answers to personal and/or financial questions posed to the user by the institution (e.g., by a virtual agent) in an interview or a questionnaire.

In some cases, a user (e.g., a customer, prospective customer, or other service subscriber) authorizes the institution, business enterprise, or other outlet or service provider to access certain data specific to the user that is not publicly available, e.g., data that can be obtained from one of the private sources mentioned above.

The web crawler 26 is configured to obtain data from external sources, such as public webpages 38 from various websites. For example, the web crawler 26 can be configured to harvest data from publicly available webpages and webpages that the financial institution is authorized to access such as social media profiles and posts associated with a user, market data associated with a neighborhood in which a user owns or seeks to purchase a home, data associated with a user's employer, etc.

The web crawler 26 can be programmed to crawl certain websites on a predefined schedule. The websites and the schedule can depend on which requests from users are pending. For example, if a particular website is known to release a document needed to provide a response to a pending user request, and it is known that that website releases such documents in a given time period (e.g., between 9 am and 5 pm on the first Monday of each calendar month), then the web crawler 26 can be configured to increase the frequency of visits to that website during the given time period. Similarly, the web crawler 26 can be programmed for reduced frequency of visits to that website, or no visits to that website outside of the given time period, or if there is no pending user request for which such documents released during the given time period on that website are needed.

Data harvested by the web crawler 26 or through another means from one or more sources of external information can be committed to the user data 24.

User data 24 can be input to one or more machine learning model(s) 16, and used by the machine learning model(s) 16 to retain requests as pending requests and ultimately to respond to requests once the needed information is released. Based on one or more factors, any of multiple storage locations can be selected by the machine learning model(s) 16 for storing the request pending release of the information needed to respond to the request.

The system 10 shows two different such storage locations, including request storage A 40 and request storage B 42. That two storage locations are depicted is for illustration purposes only. In practice, any number of storage locations can be made available.

The storage location for a given request can be selected based on the length of time predicted by the machine learning model(s) 16 until the needed information will be released. For instance, request storage A 40 may be configured for faster retrieval of tasks to be performed in the shorter term, whereas request storage B 42 may be configured for slower retrieval of tasks to be performed in the longer term. The machine learning model(s) 16 may be configured to assign a first request for which needed information is expected to be released within six hours for storage in request storage A 40, and to assign a second request for which needed information is expected to be released in six months to request storage B 42. The first request is then retained as a pending request in request storage A 40, and the second request is then retained as a pending request in request storage 42. Closer to the predicted information release associated with the second request, the pending second request may be moved to another, more quickly retrievable storage location, such as request storage A 40.

Figure 2:
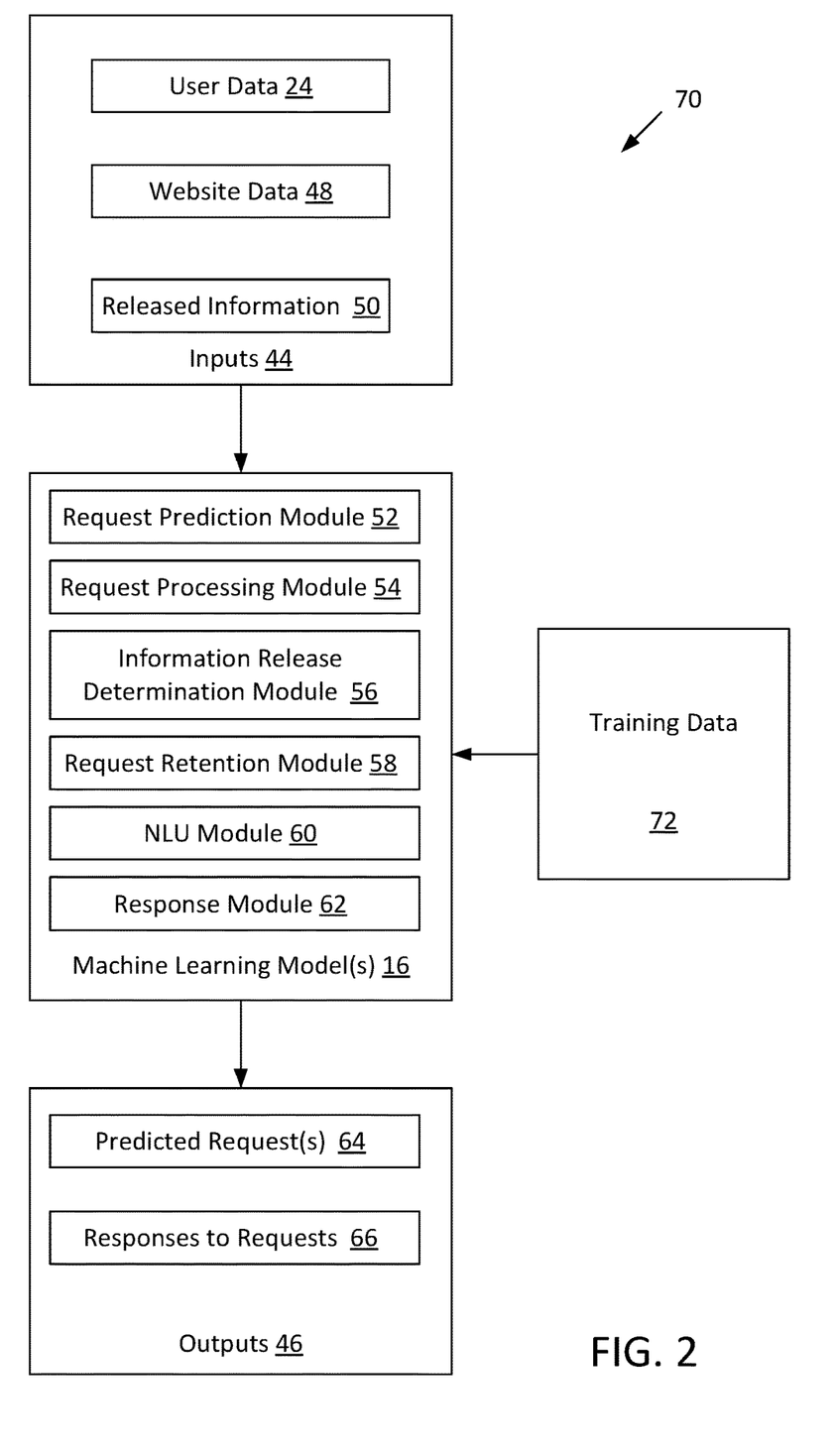
FIG. 2 schematically shows a portion of the system of FIG. 1.

FIG. 2 schematically shows a machine learning system flow 70 of the system 10 of FIG. 1. The system flow 70 includes the machine learning model(s) 16.

In general terms, the machine learning model(s) 16 receive inputs 44 and provide outputs 46. The machine learning model(s) 16 can be trained, such as a trained neural network, to provide the outputs 46 based on the inputs 44. The neural network can be supervised or unsupervised. Thus, training data 72 can be provided to the machine learning model(s) 16 for model training purposes.

According to some examples, data is fed to the neural network in various nodes of an input layer at inputs 44. Examples of inputs include words that were used in user reviews of products, a purchase history of the user that includes the name of products purchased, current economic conditions at the user's location, the user's employment and income data, etc. The input values propagate through synapses through one or more hidden layers and finally to an output layer at outputs 46. The output layer can include, among other things, a response to a submitted request or a predicted possible request for submission.

Various associations may be determined by the neural network. The neural network may determine associations between generic terms or words that are used in a context. Bigrams, which are sequences of adjacent elements, may be associated to capture language semantics. Further, synonyms may be taken into account for the associations. Words may be represented by vectors, which are lexical semantic representations. Accordingly, the vector represents how well two words align. If the words are true synonyms, they can be exchanged and used in the exact same sentences. However, most words that are thought to be synonyms are not perfectly aligned. The vector changes based on words that come before and after the synonyms. The distance between vectors represents a degree to which words are aligned where shorter distance denotes greater alignment.

The training data 72 can include, for example, known request-response pairings with known inputs and outputs. Such pairings would be those where the user, for instance, is known to have been satisfied with the auto-generated response to their request. The data relating to that pairing would also be included in the training data 72 to train the machine learning model(s) 16 how to identify the factors relating to a request that lead to an appropriate response.

The training data 72 can also include prior request data from different users with known outcomes (e.g., requests known to have adequately captured what the users were seeking) to train the machine learning model(s) 16 how to identify the factors relating to specific users that accurately predict each user's request.

The training data 72 can also include information release data with known outcomes. For instance, such data can include when certain documents were released by certain outlets or websites and associated data (e.g., the removal of a prior version of a document a certain amount of time before a new version of the document is released) that can train the machine learning model(s) on the factors that indicate when certain documents will be released and where (e.g., which webpages) they will be accessible.

The training data 72 can also include prior request-response pairings that train the machine learning model(s) how to determine, for a specific request, whether sufficient information to respond to the request is currently available, whether sufficient information will be available in the future upon release of certain information, or whether sufficient information will not be available even in the future, or within a predefined amount of time into the future (e.g., within one year).

The training data 72 can also include past known request retention data and request retrieval efficiency data indicating the storage locations where past requests were stored, and efficiencies of retrieving those requests upon release of the information needed to respond to those requests. Such training data can be used to train the machine learning model(s) 16 where to store pending requests and the factors to consider in making those decisions.

The training data 72 can also include data associated with past responses to requests, where the responses were derived at least in part from natural language understanding of released information, and where it is known that the responses adequately responded to the requests. Such data training data can be used to train the machine learning model(s) how to parse text of document or other textual information using natural language understanding in order to provide an appropriate response to a given request.

It can be appreciated that additional types of training data 72 can be provided to the machine learning model(s) 16.

Once the machine learning model(s) 16 is/are trained with the training data 72, the machine learning model(s) 16 can be run to take inputs 44 and generate outputs 46.

The inputs 44 includes the user data 24, website data 48, and released information 50. The website data 48 can be data obtained using the web crawler 26 (FIG. 1) and include any information that can be pertinent to the decisions made by the machine learning model(s) 16. The released information 50 can include documents and other text information that is released after a request is made. The released information 50 can be obtained by, e.g., the web crawler 26.

The machine learning model(s) 16 include a request prediction module. The request prediction module 52 is configured, using the inputs 44 and the training data 72, to provide a possible personalized request that a user intends. The predicted intended request can be specific to the user. Thus, for example, the request prediction module 52 can be configured to generate request options in the form of frequently asked questions (FAQs), but that are specific to the user and based on personal data of the user. For instance, user data 24 that indicates that a specific user has recently lost a job or sent a child to college can be used by the request prediction module 52 to generate possible requests that take that personal data into account.

The request processing module 54 processes a request that has actually been submitted by a user. For example, three possible request options generated by the request prediction module 52 are presented to the user and the user selects one of them. The selected request is then processed by the request processing module 54. The request processing module 54 is configured to determine what information is needed to respond to the request and whether the information is presently available. If all the information needed to respond to the request is presently available, the request can be handed off to the response module 62 to generate an appropriate response to the request. If all the information needed to respond to the request is not presently available but will be released at a later time, the request can be passed to the request retention module 58.

The request retention module 58 is configured to select an appropriate location (e.g., the request storage A 40, the request storage B 42, etc. (FIG. 1)) to store the request as a retained request pending release of the information needed to respond to the request. The location can be selected to maximize consumption of computing resources and minimize retrieval time of the request when the information needed to respond to the request is released.

The information release determination module (IRDM) 56 is configured to predict when information needed to respond to a given request will be released and available for generating a response to the request. The IRDM 56 is also configured to determine which documents or other forms of information will be released that will contain the needed information. The IRDM 56 can be trained to identify documents and other sources of information relevant to specific requests using training data where known documents and other sources of information were known to be used to respond to known requests.

The IRDM 56 and the request retention module 58 can work together to store, move and retrieve requests based on predicted release times for needed information.

The NLU module 60 is configured to perform natural language understanding on text content, such as text retrieved by the web crawler 26 (FIG. 1) from webpages, documents, etc. The NLU module 60 is configured to parse such textual content to derive information from those texts that is responsive to a pending request or is otherwise relevant in order to respond to the request. For instance, the NLU module 60 can be configured to identify sequences of words and map them, e.g., using vector analysis, to known meanings for those sequences. The mapped meanings can then be used by the NLU module 60 to provide or contribute to a response to a pending request.

In certain examples, the NLU module 60 can be trained on specific domains. Typically, language models are trained on large generalized data sets. Pre-training the model(s) 16 models on domain-specific knowledge can provide substantial gains over one that is trained on general knowledge, or mixed domain knowledge. Thus, in some examples relating to the financial institutions, the NLU module 60 can be trained by unsupervised language modeling based on financial specific data that is obtained internally or externally.

The response module 62 is configured to generate a response to a pending request. The response module 62 can generate a response based on information available at the time of the request (e.g., the user data 24 and/or the website data 48) and/or information released at a later time (e.g., information parsed by the NLU module 60 from documents or other text released after the request was submitted).

The outputs 46 of the machine learning model(s) 16 can include predicted request(s) 64 and responses to requests 66.

The predicted requests(s) 64 can include possible requests determined by the request prediction module 52.

The responses to request(s) 66 can include the responses determined by the response module 62.

The outputs 46 can be provided to, e.g., the user device 14, for display on one or more graphical interfaces 32 (FIG. 1).

Figure 3:
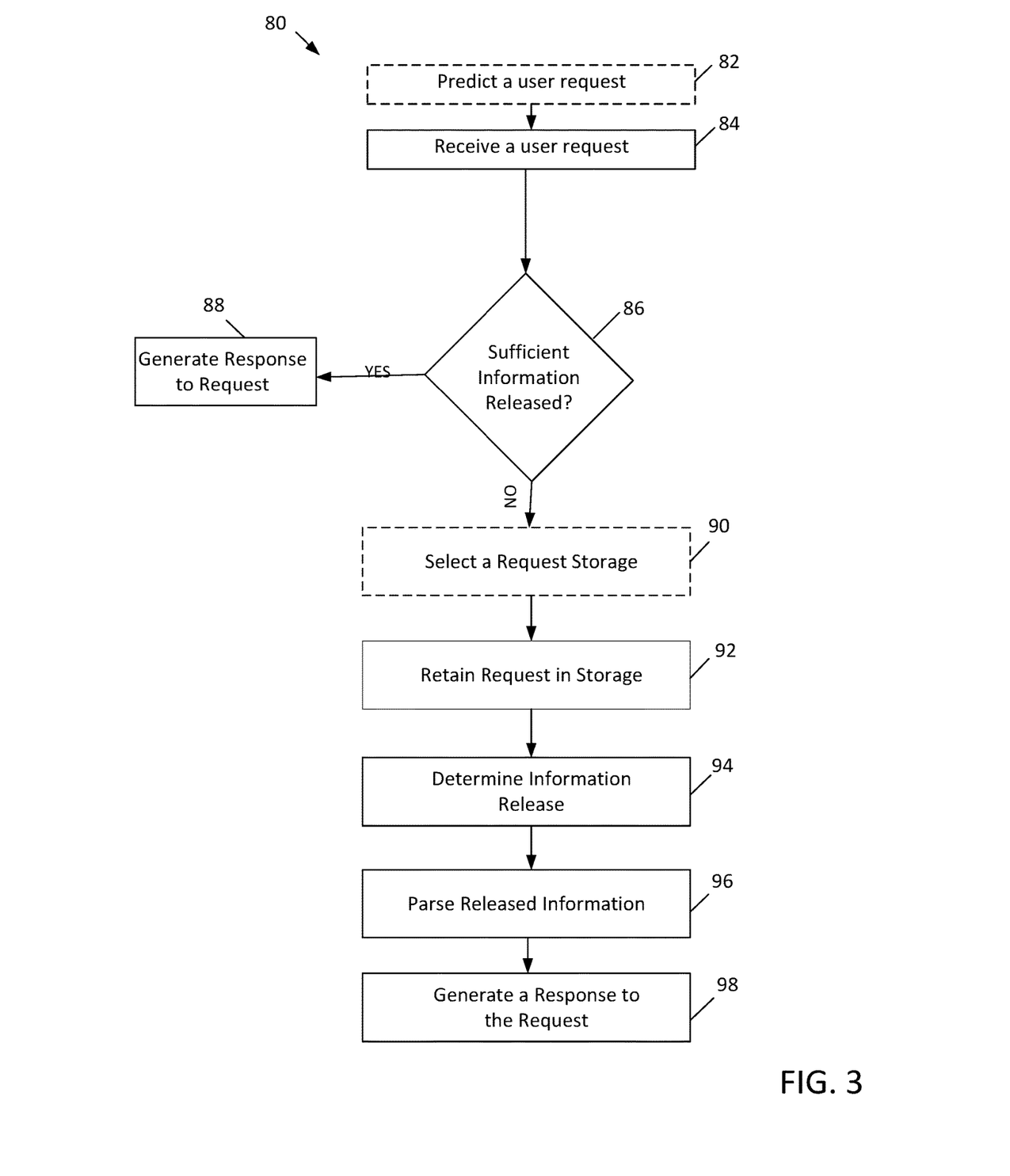
FIG. 3 is an example process flow and decision tree that can be performed using the system of FIG. 1.

FIG. 3 is an example process flow and decision tree 80 that can be performed using the system 10 of FIG. 1. Referring to FIG. 3, in certain embodiments, at a step 82, a user request is predicted. The predicted request, or multiple possible requests, can then be presented to the user, e.g., with a virtual agent and via the user device 14 (FIG. 1). In certain embodiments, the step 82 is omitted, and the request is submitted by the user without the system predicting the request or possible requests. For example, the step 82 can be performed by the request prediction module 52 (FIG. 2).

At a step 84, a user request is received. The user request can be selected from possible user requests presented to the user, or otherwise entered and submitted by the user.

At a step 86, the system 10 determines whether sufficient information has been released to adequately respond to the received request. The step 86 can be performed by the request processing module 54 (FIG. 2).

If, at the step 86, it is determined that sufficient information is available to adequately respond to the request, then at the step 88, a response to the request is generated. The response can be generated by a combination of the NLU module 60 and the response module 62 (FIG. 2).

In some examples, if at the step 86 it is determined that sufficient information will not be available in the future, or within a predefined threshold point in time in the future, then the user can be automatically notified (e.g., by a virtual agent) as such. In some of these examples, a response to the request can be provided to the user with a disclaimer that the response is based on incomplete information.

If, at the step 86, it is determined that insufficient information has been released to adequately respond to the request but that sufficient information will be released at a later time then, in some examples, a storage location is selected for the request at a step 90. The step 90 can be performed by the request retention module 58 (FIG. 2). The step 90 can also include predicting when the needed information will be released. In some examples, if at the step 86, it is determined that insufficient information has been released to adequately response to the request then, in some examples, a notification is issued that can be viewed or otherwise received on the user device 14 indicating when a response to the request can be expected. When the response can be expected can be based on the predicted time of release of the needed information.

At a step 92, the request is retained in storage pending release of the needed information.

At a step 94, it is determined that the needed information has been released. This step can be performed by the IRDM 56 (FIG. 2). The step 94 can also include retrieval of the pending request from storage.

At a step 96, text of the released information is parsed, e.g., with the NLU module 60 (FIG. 2), so that the released information can be understood and thereby used to respond to the pending request using the released information.

At a step 98, a response, based on the understood released information, is then generated by the response module 62 (FIG. 2). The response can then be provided to the user device 14 (FIG. 1).

Figure 4:
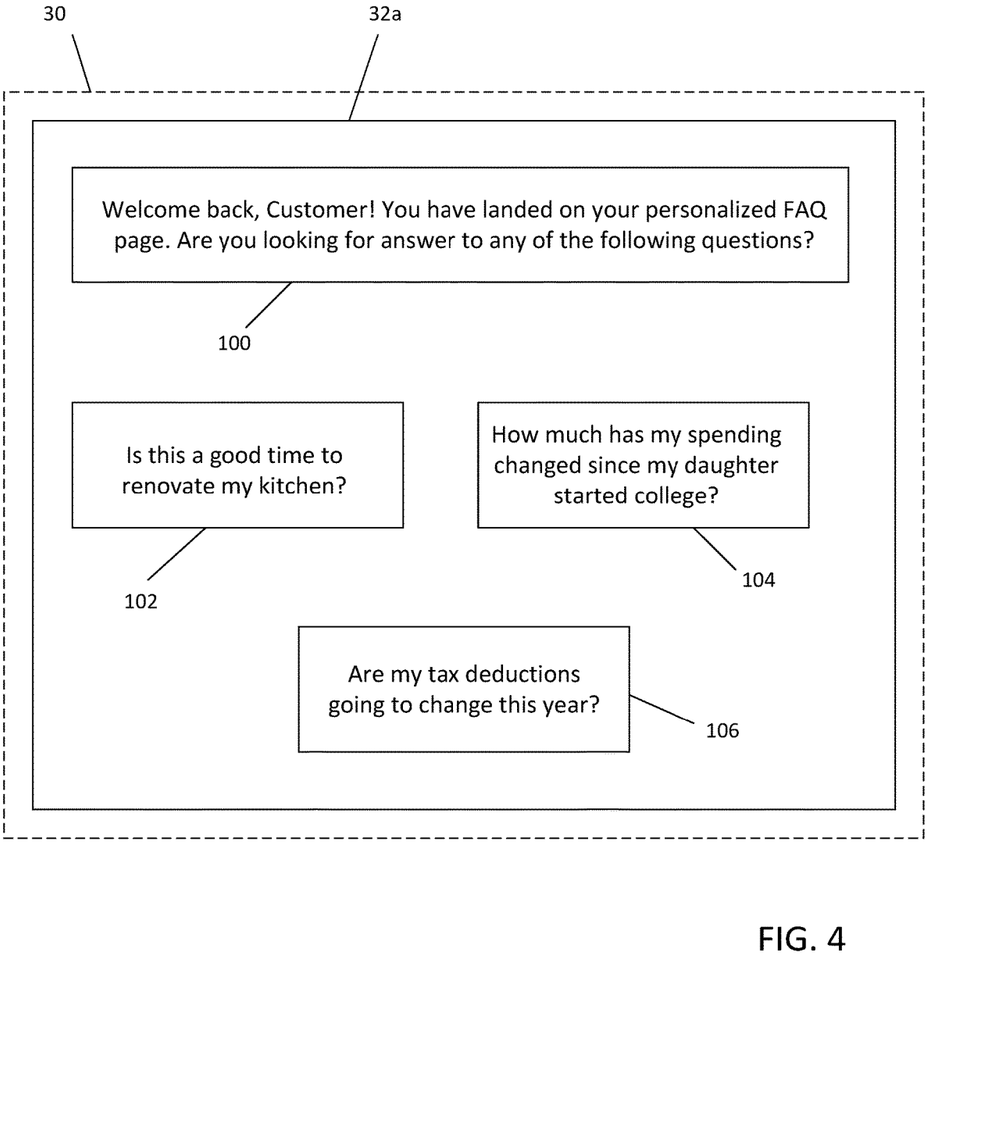
FIG. 4 depicts an example interactive graphical interface generated by the system of FIG. 1.

FIG. 4 depicts an example interactive graphical interface 32*a* generated by the system 10 of FIG. 1. The interface 32*a* can be one of the interfaces 32 of FIG. 1. The interface 32*a* is displayed using the I/O device 30 of the user device 14 of FIG. 1.

The content of the interface 32*a* can be generated by the request prediction module 52 (FIG. 2). The content includes a personalized FAQ-type page that is personalized to the user. For example, the user can be presented with the interface 32*a* after logging onto their account with a financial institution or other business enterprise.

The content includes a prompt 100 that points the user toward possible requests generated by the request prediction module 52. The possible requests are specific to the user (e.g., based on data that is specific to the user) and are presented as selectable buttons 102, 104 and 106, though other forms interactive graphical elements (e.g., a dropdown menu), can be provided.

In some examples, upon selection by the user of one of the buttons 102, 104, 106 the corresponding request is then retained until information needed to adequately respond to the request is released. Upon release of the needed information, the retained request is responded to, as shown in FIG. 5.

Figure 5:
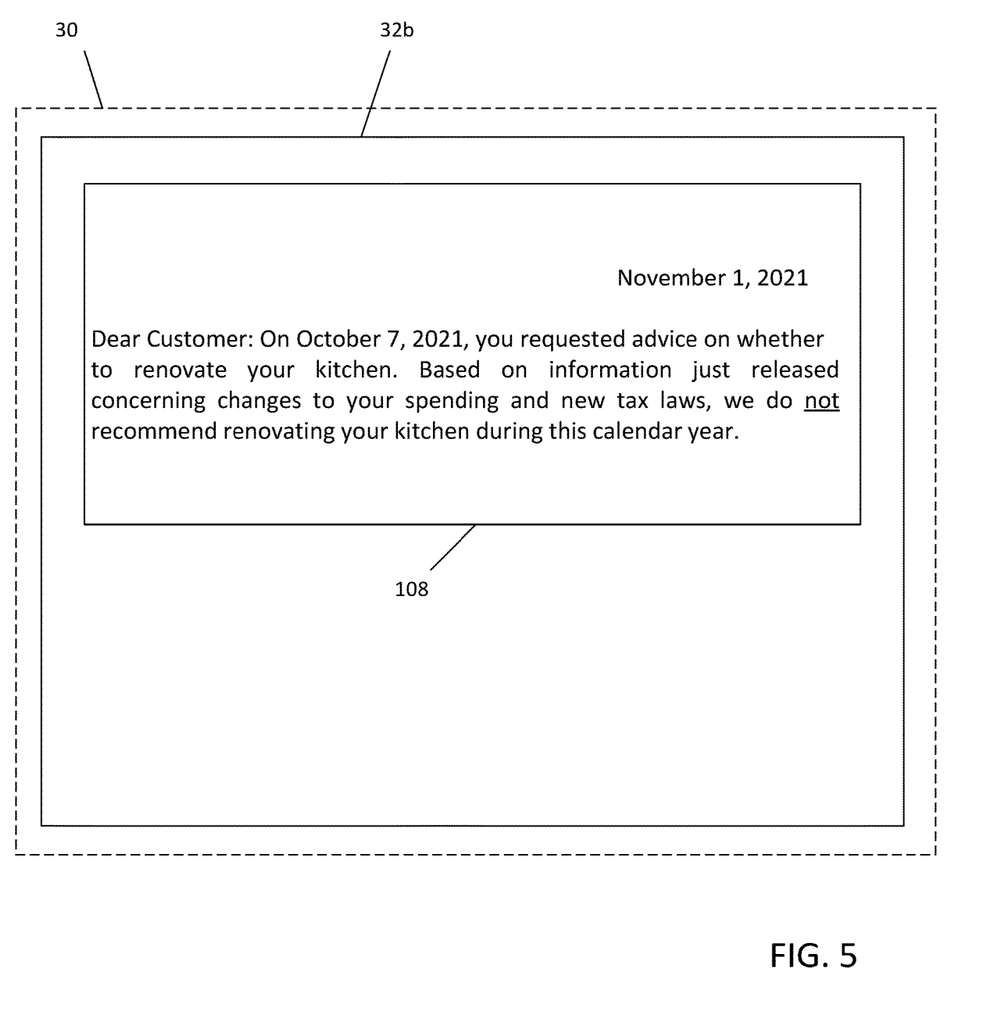
FIG. 5 depicts another example interactive graphical interface generated by the system of FIG. 1.

FIG. 5 depicts another example interactive graphical interface 32b generated by the system 10 of FIG. 1. The interface 32b can be one of the interfaces 32 of FIG. 1. The interface 32b is displayed using the I/O device 30 of the user device 14 of FIG. 1.

In this example, the user has selected the button 102 (FIG. 4) corresponding to one of three possible requests represented, and thereby submits that request. The interface 32b includes a textual response 108 to the selected and submitted request. The response 108 can be generated using the request processing module 54, the NLU module 60, and the response module 62 (FIG. 2). Using the request retention module 58 and the IRDM 56 (FIG. 2), the response 108 can be provided very soon (e.g., less than 10 seconds, less than 60 seconds, less than 30 minutes (other time periods are possible)) after the needed information is released. The response 108 can be provided in an email to the user's email account, in a text message to the user's phone number, formulated as an audio message to the user's phone number, or upon the user's logging into their account with the financial institution or other business enterprise.

The response 108 is specifically tailored to the user (e.g., based on user-specific data) and specifically tailored to the request.

The example interfaces shown in FIGS. 4 and 5 track the kitchen renovation example use case described above. More specifically, the response 108 includes advice on whether the user should renovate their kitchen, as well as a rationale for the advice. It should be appreciated that many types of requests in the form many different types of questions can be handled by the system 10 (FIG. 1), in both predicting the requests that the users are seeking responses to, and providing tailored responses upon release of the needed information. In some examples, the response 108 can identify the document, documents, or other information that was released from which the response was determined.

Thus, for instance, the system 10 (FIG. 1) and the process flow (FIG. 3) may be used to answer a financial question, provide a product recommendation, notify a user about the release of sought after information, or fulfill other types of requests of users.

As further described above, the system 10 (FIG. 1) can also predict a user intent a user intent, in that the system can predict a request a user might intend. Such intent can be determined based on information that is available, such as the user's purchase history, loan history, age, sex, geography, prior communications between the user and the financial institution or other business enterprise, social media footprint, and web browsing history. Any or all of these types of information can be included in the user data 24 and/or the website data 48.

In an example use case where the system 10 (FIG. 1) generates a user-specific product purchase recommendation in response to a submitted request, the machine learning model(s) 16 can be trained to calculate affinity scores for various products based on market data such as market research, product development, and product placement. Such data (e.g., user data 24, website data 48) can be already released at the time of the request submission or released at a later time. The affinity analysis is performed to find frequent patterns, associations, correlations, and causal structures among sets of items. Such associations may aid in understanding user purchasing habits. Advantageously, affinity analysis does not necessarily group customers. Instead, the affinity analysis processes each customer individually based on a personal profile (e.g., aspects of the user data 24). In some examples, the response includes multiple recommendations for product purchases presented in a ranked format according to the affinity analysis.

Figure 6:
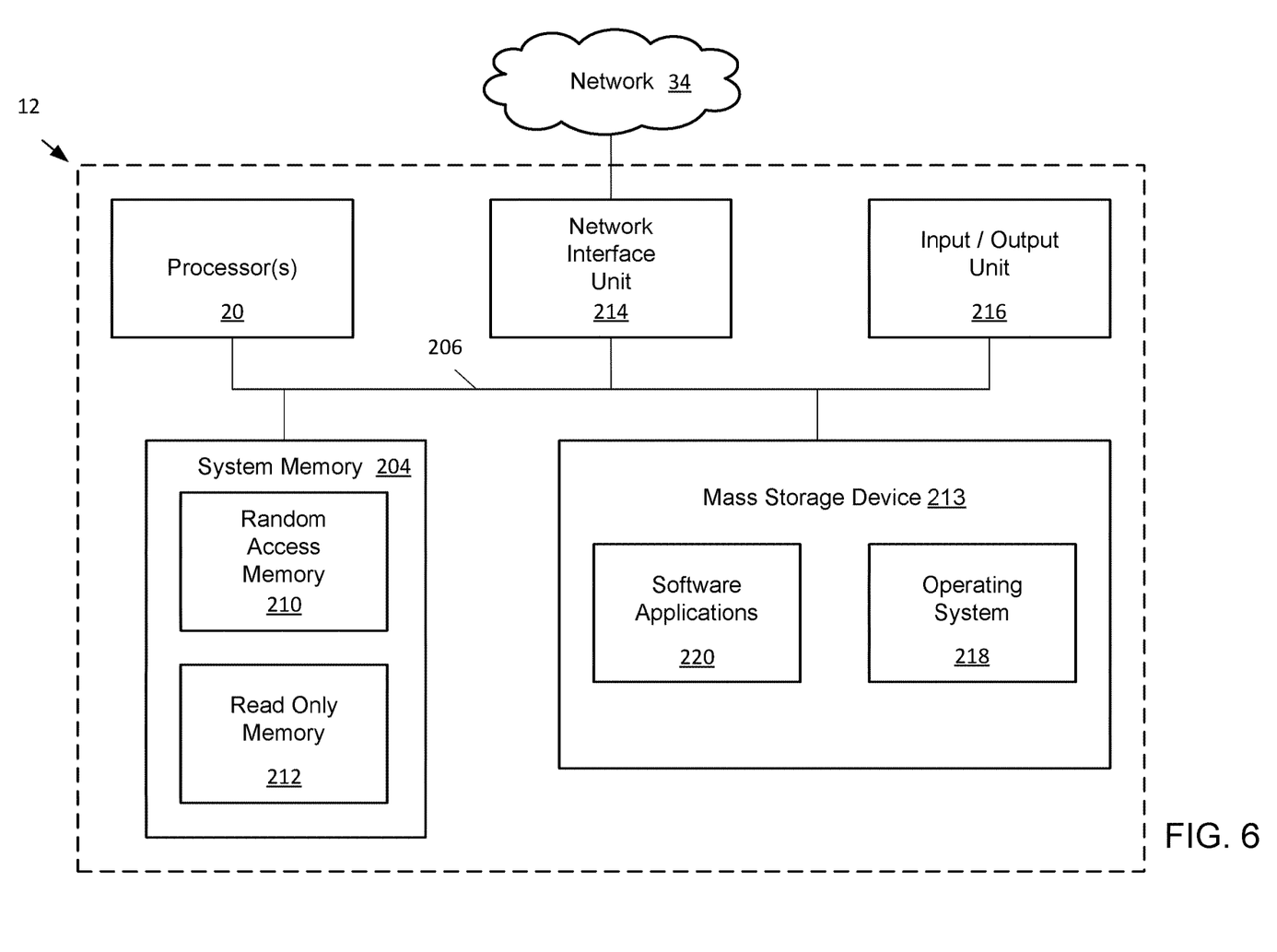
FIG. 6 schematically shows example computing components of a server of the system of FIG. 1.

Additional components of the server 12 are illustrated in FIG. 6. In this example, the server 12 provides the computing resources to perform the functionality associated with the system 10 (FIG. 1). The user device 14 and other computing resources associated with the system 10 can be similarly configured.

The server 12 can be an internally controlled and managed device (or multiple devices) of the financial institution or other business enterprise. Alternatively, the server 12 can represent one or more devices operating in a shared computing system external to the institution or enterprise, such as a cloud. Further, the other computing devices disclosed herein can include the same or similar components, including the user device 14.

Via the network 34, the components of the server 12 that are physically remote from one another can interact with one another.

The server 12 includes the processor(s) 20, a system memory 204, and a system bus 206 that couples the system memory 204 to the processor(s) 20.

The system memory 18 includes a random access memory ("RAM") 210 and a read-only memory ("ROM") 212. A basic input/output system that contains the basic routines that help to transfer information between elements within the server 12, such as during startup, is stored in the ROM 212.

The server 12 further includes a mass storage device 213. The mass storage device 213 can correspond to the memory 18 of the system 10 (FIG. 1). The mass storage device 213 is able to store software instructions and data, such as the modules of the machine learning model(s) 16 (FIG. 2), the web crawler 26, and the user data 24 (FIG. 1).

The mass storage device 213 is connected to the processor(s) 20 through a mass storage controller (not shown) connected to the system bus 206. The mass storage device 213 and its associated computer-readable data storage media provide non-volatile, non-transitory storage for the server 12. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server 12.

According to various embodiments of the invention, the server 12 may operate in a networked environment using logical connections to remote network devices through the network 34, such as a wireless network, the Internet, or another type of network. The server 12 may connect to the network 34 through a network interface unit 214 connected to the system bus 206. It should be appreciated that the network interface unit 214 may also be utilized to connect to other types of networks and remote computing systems. The server 12 also includes an input/output unit 216 for receiving and processing input from a number of other devices, including a touch user interface display screen, an audio input device, or another type of input device. Similarly, the input/output unit 216 may provide output to a touch user interface display screen or other type of output device, including, for example, the I/O device 30 (FIG. 1).

As mentioned briefly above, the mass storage device 213 and/or the RAM 210 of the server 12 can store software instructions and data. The software instructions include an operating system 218 suitable for controlling the operation of the server 12. The mass storage device 213 and/or the RAM 210 also store software instructions and applications 220, that when executed by the processor(s) 20, cause the server 12 to provide the functionality of the system 10 described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer-implemented method, comprising:
    training a machine learning model to predict when documents will be available from webpages, thereby providing a trained machine learning model;
    receiving, by a server, a first request for first information and a second request for second information different from the first information;
    determining, by the server, that a first document including the first information has not been released;
    determining, by the server, that a second document different from the first document and including the second information has not been released;
    generating, by the trained machine learning model, predictions of when the first document will be available from a first webpage and when the second document will be available from a second webpage, the first webpage being different from the second webpage;
    configuring, based on the predictions, a web crawler included on the server to:
        access the first webpage at a first frequency based on one of the predictions; and
        access the second webpage at a second frequency different from the first frequency and based on another of the predictions;
    accessing, by the web crawler, the first webpage at the first frequency, and thereby obtaining, by the web crawler, the first document from the first webpage after the first document is released;
    accessing, by the web crawler, the second webpage at the second frequency and thereby obtaining, by the web crawler, the second document from the second webpage after the second document is released;
    retaining the first request until the first information is released and retaining the second request until the second information is released;
    parsing, by the server, the first document, when released, to obtain the first information from the first document;
    based on the parsing the first document, generating, by the server, a first response to the first request, the first response including the first information;
    parsing, by the server, the second document, when released, to obtain the second information from the second document; and
    based on the parsing the second document, generating, by the server, a second response to the second request, the second response including the second information.

2. The method of claim 1, wherein the first response includes a computer-generated text message or a computer-generated audio message.

3. The method of claim 1, further comprising:
    determining when the first document is scheduled to be released; and
    selecting a storage location in a computer memory for storing the first request based on a length of time until the first document is released.

4. The method of claim 1, further comprising generating a message indicating when the first response will be provided.

5. The method of claim 4, further comprising determining when the first response will be provided based on a scheduled release of the first document.

6. The method of claim 1, further comprising:
    generating a possible request, the possible request corresponding to the first request; and
    providing the possible request for display at a graphical interface,
    wherein the receiving the first request includes receiving a selection, via the graphical interface, of the possible request.

7. The method of claim 6, wherein the generating the possible request includes:
    processing, with the trained machine learning model, data relating to a user; and
    based on the processing, using the trained machine learning model to output the possible request.

8. The method of claim 7, wherein the data includes a prior request for information associated with the user.

9. The method of claim 7, wherein the data includes a purchase history associated with the user.

10. The method of claim 7, further comprising:
    determining, with the trained machine learning model and based on the possible request, that the first document will include the first information.

11. The method of claim 6,
    wherein the generating the possible request includes receiving, via another graphical interface, a selection of an unreleased document, the selection of the unreleased document corresponding to the first document.

12. The method of claim 1, wherein the first response includes an indication that the first document has been released.

13. The method of claim 1, wherein the parsing, by the server, the first document includes applying natural language understanding to text of the first document.

14. The method of claim 1, wherein the first response includes a recommendation, based on the first request and the first information, to perform or not to perform a financial action.

15. A system, comprising:
one or more processors; and
non-transitory computer-readable instructions that, when executed by the one or more processors, cause the system to:
  train a machine learning model to predict when documents will be available from webpages, thereby providing a trained machine learning model;
  receive, at a first time, a first request for first information;
  receive, at a second time, a second request for second information;
  determine, using a web crawler, that a first document containing the first information has not been released at the first time and, based thereon, retain the first request until a third time that is after the first time;
  determine, using the web crawler, that a second document different from the first document and containing the second information has not been released at the second time;
  generate, by the trained machine learning model, predictions of when the first document will be available from a first webpage and when the second document will be available from a second webpage, the first webpage being different from the second webpage;
  configure, based on the predictions, the web crawler to:
    access the first webpage at a first frequency based on one of the predictions; and
    access the second webpage at a second frequency different from the first frequency and based on another of the predictions;
  access, by the web crawler, the first webpage at the first frequency, and thereby obtain, by the web crawler, the first document from the first webpage after the first document is released at a fourth time that is after the first time;
  access, by the web crawler, the second webpage at the second frequency and thereby obtain, by the web crawler, the second document from the second webpage after the second document is released;
  parse text of the first document using natural language understanding to obtain the first information from the first document;
  generate, at or before the third time, a first response to the first request, the first response including the first information and being triggered by the first information being obtained from the first document;
  parse text of the second document using natural language understanding to obtain the second information from the second document; and
  generate a second response to the second request, the second response including the second information and being triggered by the second information being obtained from the second document.

16. The system of claim 15, wherein the first response includes a computer-generated text message or a computer-generated audio message.

17. The system of claim 16, including further instructions which, when executed by the one or more processors, cause the system to:
  generate another message indicating when the first response will be provided based on a scheduled release of the first document.

18. The system of claim 17, wherein the first response includes an indication that the first document has been released.

19. The system of claim 15, wherein the first response includes a recommendation, based on the first request and the first information, to perform or not to perform a financial action.

20. A computer-implemented method, comprising:
  training a machine learning model to predict when documents will be available from webpages, thereby providing a trained machine learning model;
  receiving, by a server at a first time, a first request for first information associated with a financial action;
  receiving, by the server at a second time, a second request for second information;
  determining, using a web crawler, that a first document including the first information has not been released at the first time;
  determining, using the web crawler, that a second document different from the first document and containing the second information has not been released at the second time;
  determining, by the server, that the first document is scheduled to be released at a third time that is after the first time;
  retaining the first request until a fourth time that is after the first time and at or after the third time, including:
    selecting a storage location in a computer memory for storing the first request based on a length of time between the first time and the third time; and
    storing the first request in the storage location;
  generating, by the trained machine learning model, predictions of when the first document will be available from a first webpage and when the second document will be available from a second webpage, the first webpage being different from the second webpage;
  configuring, by the server and based on the predictions, the web crawler to:
    access the first webpage at a first frequency based on one of the predictions; and
    access the second webpage at a second frequency different from the first frequency and based on another of the predictions;
  accessing, by the web crawler, the first webpage at the first frequency, and thereby obtaining, by the web crawler, the first document from the first webpage after the first document is released and at or after the third time;
  accessing, by the web crawler, the second webpage at the second frequency and thereby obtaining, by the web crawler, the second document from the second webpage after the second document is released;
  parsing, by the server using natural language understanding, text of the first document to obtain the first information from the first document;
  based on the parsing, generating by the server, at or after the third time, a first response to the first request, the first response including a text message or an audio message including:
    the first information; and
    a recommendation to perform or not to perform the financial action;
  parsing, by the server, text of the second document using natural language understanding to obtain the second information from the second document; and
  generating, by the server a second response to the second request, the second response including the second information and being triggered by the second information being obtained from the second document.

* * * * *